United States Patent
Sun et al.

(10) Patent No.: US 11,491,983 B1
(45) Date of Patent: Nov. 8, 2022

(54) VEHICLE COASTING OPTIMIZATION

(71) Applicants: Hyundai Motor Company, Seoul (KR); Kia Corporation, Seoul (KR)

(72) Inventors: Yong Sun, Ann Arbor, MI (US); Jinho Ha, Seoul (KR); Jason Hoon Lee, Ann Arbor, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/339,163

(22) Filed: Jun. 4, 2021

(51) Int. Cl.
| | |
|---|---|
| *B60W 30/18* | (2012.01) |
| *B60W 10/18* | (2012.01) |
| *B60W 30/08* | (2012.01) |
| *B60W 30/182* | (2020.01) |
| *B60W 40/04* | (2006.01) |
| *B60W 40/06* | (2012.01) |

(52) U.S. Cl.
CPC ...... *B60W 30/18072* (2013.01); *B60W 10/18* (2013.01); *B60W 30/08* (2013.01); *B60W 30/182* (2013.01); *B60W 30/18109* (2013.01); *B60W 40/04* (2013.01); *B60W 40/06* (2013.01); *B60W 2030/1809* (2013.01)

(58) Field of Classification Search
CPC .......... B60W 30/18072; B60W 30/08; B60W 30/182; B60W 10/18; B60W 40/04; B60W 40/06; B60W 30/18109; B60W 2030/1809
See application file for complete search history.

(56) References Cited

U.S. PATENT DOCUMENTS

| | | | |
|---|---|---|---|
| 9,096,221 B2 * | 8/2015 | Kim ...................... | B60W 20/14 |
| 9,540,004 B2 * | 1/2017 | Kim ...................... | B60W 10/02 |
| 9,604,644 B2 * | 3/2017 | Kim ..................... | B60W 10/115 |
| 9,623,870 B2 | 4/2017 | Kuroki et al. | |
| 10,710,589 B2 * | 7/2020 | Tashiro ................. | B60W 10/02 |
| 2011/0245005 A1 * | 10/2011 | Tsutsui ................ | F16H 61/0437 |
| | | | 475/121 |
| 2015/0158491 A1 * | 6/2015 | Suzuki .................. | B60W 10/02 |
| | | | 701/67 |

* cited by examiner

*Primary Examiner* — Tinh Dang

(74) *Attorney, Agent, or Firm* — Fox Rothschild LLP

(57) ABSTRACT

Methods and systems are described for vehicle coasting optimization. The system may include a vehicle having an engine, a drivetrain, and an accelerator. The system may include selecting a fuel-saving mode based on an anticipated braking requirement in response to detecting the vehicle is non-stationary and the accelerator is disengaged. The system may include generating an instruction corresponding the selected fuel-saving mode, wherein the instruction is configured to control at least the engine and the drivetrain.

20 Claims, 8 Drawing Sheets

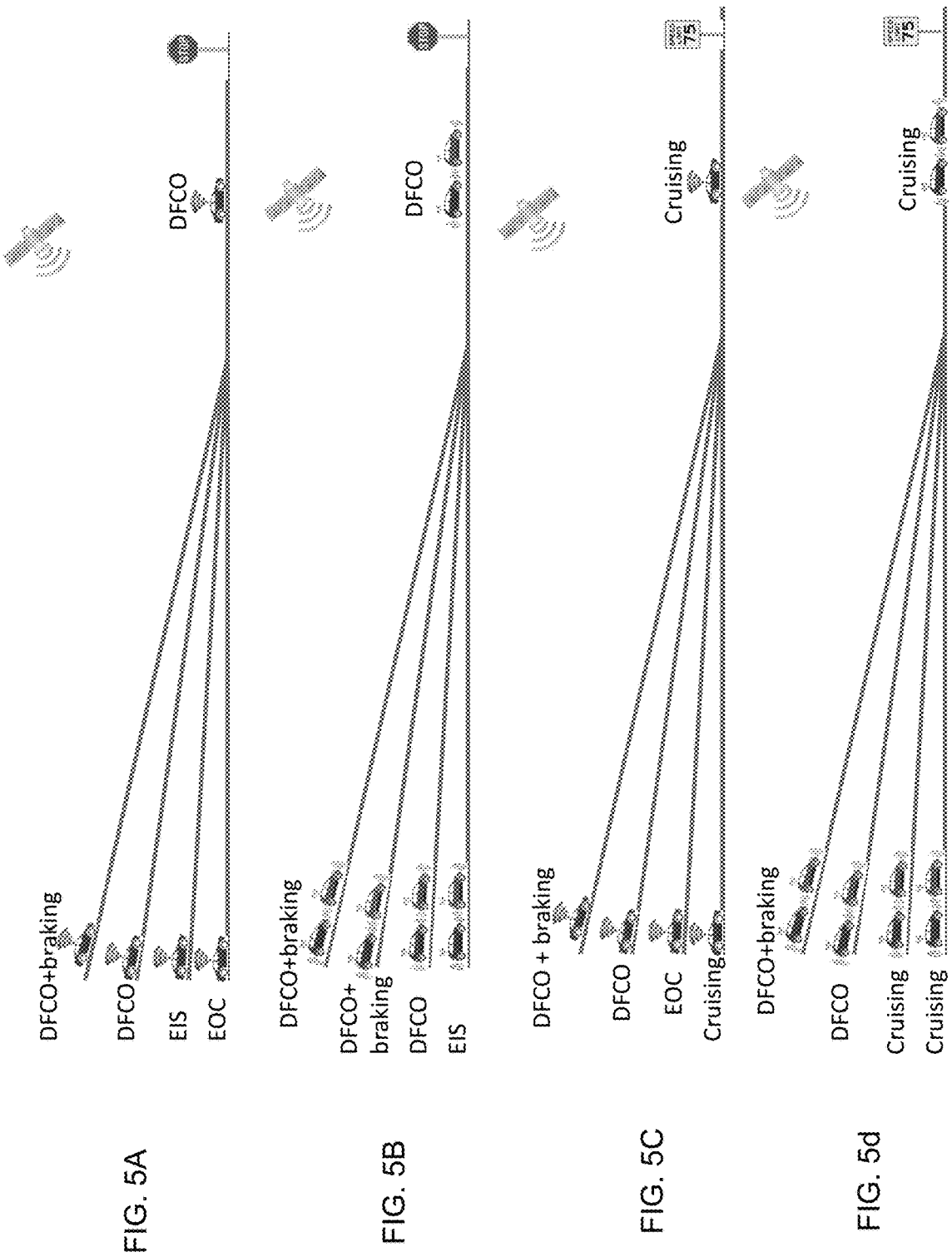

VEHICLE COASTING OPTIMIZATION

TECHNICAL FIELD

The present disclosure relates generally to vehicle coasting optimization, and more particularly, to vehicle coasting optimization that maintains safe driving conditions during coasting.

BACKGROUND

When acceleration is not needed, a vehicle may coast and to reduce fuel consumption. Typically, a vehicle coasts with the drivetrain engaged to the engine. Coasting with the drivetrain engaged to the engine enables quick engagement of the accelerator but may prevent the vehicle from coasting as far or as fast as disengaging the drivetrain from the engine. Coasting with the drivetrain engaged to the engine may consume more fuel than turning off the engine or disengaging the drivetrain from the engine.

Some vehicles may disengage the drivetrain from the engine while coasting to reduce fuel consumption. But disengaging the drivetrain from the engine while coasting may present safety concerns such as reduced driver control, reduced steering assistance, and the elimination of engine braking. Disengaging the drivetrain from the engine may be dangerous due to. Such safety concerns are heightened when the vehicle is traveling along a steep downhill gradient or vehicles are nearby. Currently, vehicle manufacturers only engage the drivetrain to the engine while coasting to minimize safety concerns even though there is a demand for more fuel-saving measures.

SUMMARY

The present disclosure provides methods, systems, articles of manufacture, including computer program products, for vehicle coasting optimization.

In one aspect, there is provided a system including a vehicle having an engine, a drivetrain, and an accelerator. The system may further include at least one processor and at least one memory. The at least one memory may store instructions. When executed by the at least one data processor, the instructions may cause the at least one data processor to at least: select a fuel-saving mode based on an anticipated braking requirement in response to detecting the vehicle is non-stationary and the accelerator is disengaged; and generate an instruction corresponding the selected fuel-saving mode, wherein the instruction is configured to control at least the engine and the drivetrain.

In some variations, one or more of the features disclosed herein including the following features can optionally be included in any feasible combination. In some implementations, the fuel-saving mode is at least one of a engaged drivetrain coasting mode, an engine-idle coasting mode, and an engine-off coasting mode, and wherein the engaged drivetrain coasting mode includes connecting the drivetrain to the engine and turning off the engine, the engine-idle coasting mode includes disconnecting the drivetrain from the engine and maintaining the engine at or above a minimum speed required to prevent stalling, and the engine-off coasting mode includes disconnecting the drivetrain from the engine and turning the engine off. In some implementations, the anticipated braking requirement is based on a road condition and wherein the road condition is detected by at least one of an advanced driver-assistance system, a vehicle-to-everything communication, and a telematics system.

In some implementations, the road condition includes at least one of a road gradient profile, a traffic sign, a traffic light, a construction zone, a change in a speed limit, an obstacle in a road, and a road curvature. In some implementations, the anticipated braking requirement is based on at least one of a weather condition and a proximate vehicle. In some implementations, the fuel-saving mode is further based on whether a preceding vehicle is located within a predetermined distance to the vehicle and a nearby vehicle is located in an adjacent lane. In some implementations, the fuel-saving mode is further based on determining a moving distance of the vehicle without accelerator engagement. In some implementations, the moving distance of the vehicle without accelerator engagement is calculated by at least one of an advanced driver-assistance system, a vehicle-to-everything communication, and a telematics system. In some implementations, the moving distance of the vehicle without accelerator engagement is further based on an upcoming road condition detected by at least one of an advanced driver-assistance system, a vehicle-to-everything communication, and a telematics system. In some implementations, the fuel-saving mode is further based on an anticipated reengagement of the accelerator determined by at least one of advanced driver-assistance system, a vehicle-to-everything communication, and a telematics system.

In another aspect, there is provided a non-transitory computer-readable medium comprising instructions. When executed by the at least one data processor, the instructions may cause operations including selecting a fuel-saving mode based on an anticipated braking requirement in response to detecting the vehicle is non-stationary and the accelerator is disengaged; and generating an instruction corresponding the selected fuel-saving mode, wherein the instruction is configured to control at least the engine and the drivetrain.

In some variations, one or more of the features disclosed herein including the following features can optionally be included in any feasible combination. In some implementations, the fuel-saving mode is one of an engaged drivetrain coasting mode, an engine-idle coasting mode, and an engine-off coasting mode, and wherein the engaged drivetrain coasting mode includes connecting the drivetrain to the engine and turning off the engine, the engine-idle coasting mode includes disconnecting the drivetrain from the engine and maintaining the engine at or above a minimum speed required to prevent stalling, and the engine-off coasting mode includes disconnecting the drivetrain from the engine and turning the engine off. In some implementations, the engaged drivetrain coasting mode is selected in response to an operator enabling a brake of the non-stationary vehicle.

In some implementations, the anticipated braking requirement is based on a proximate vehicle detected by at least one of an advanced driver-assistance system, a vehicle-to-everything communication, and a telematics system. In some implementations, the anticipated braking requirement is based on at least one of a road condition and detection of a proximate vehicle, and wherein the anticipated braking requirement is based on a road gradient profile satisfying a threshold using information gathered by at least one of an advanced driver-assistance system, a vehicle-to-everything communication, and a telematics system. In some implementations, the engine-idle coasting mode is selected based on at least one of traffic sign and a traffic signal requiring the non-stationary vehicle to reduce a speed thereof, the at least one of the traffic sign and the traffic signal detected by at least one of an advanced driver-assistance system, a vehicle-to-everything communication, and a telematics system. In some implementations, the engine-idle coasting mode or the engine off coasting mode is selected in response to determining that the anticipated braking requirement is unnecessary for a time interval calculated by at least one of an advanced driver-assistance system, a vehicle-to-everything communication, and a telematics system. In some implementations, the engine-off coasting mode is enabled in response to an advanced driver-assistance system, a vehicle-to-everything communication, and a telematics system determining that an upcoming road condition does not present a safety concern requiring braking.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer-implemented methods consistent with one or more implementations of the current subject matter can be implemented by one or more data processors residing in a single computing system or multiple computing systems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5A depicts a diagram of an example in which various fuel-saving modes are utilized based on a road gradient, the stop sign, and no proximate vehicle;

FIG. 5B depicts a diagram of an example in which various fuel-saving modes are utilized based on a road gradient, the stop sign, and a proximate vehicle;

FIG. 5C depicts a diagram of an example in which various fuel-saving modes are utilized based on a road gradient, a speed limit sign, and no proximate vehicle;

FIG. 5D depicts a diagram of an example in which various fuel-saving modes are utilized based on a road gradient, a speed limit sign, and a proximate vehicle;

DETAILED DESCRIPTION

Figure 1:
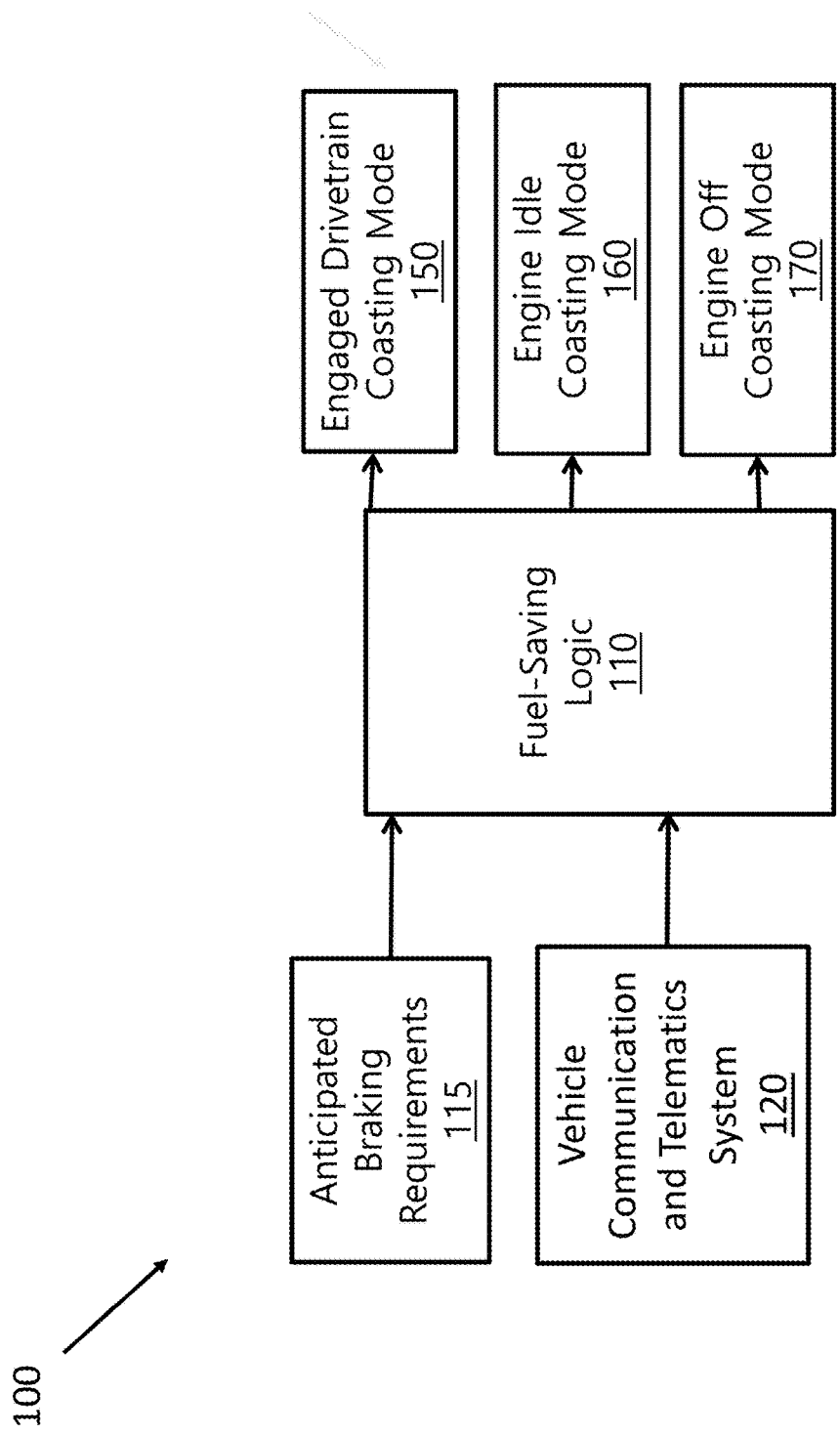
FIG. 1 depicts a block diagram illustrating an example of a system for controlling a fuel-saving mode of a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The coasting vehicle may select a fuel-saving mode that consumes the least amount of fuel that ensures safe driving conditions. The fuel-saving mode may be selected by evaluating the anticipated braking requirements under the circumstances. The fuel-saving mode may be selected by evaluating information from a vehicle communication and monitoring system. Fuel-saving modes, such as turning off the engine while coasting, may have fewer safety concerns due to the vehicle communication and monitoring system scanning the vehicle surroundings and road ahead for potential dangers. Fuel-saving modes may apply to any vehicle with an engine and a drivetrain, including vehicles with internal combustion engines, hybrid vehicles, autonomous vehicles, electrically powered vehicles, and the like.

FIG. 1 depicts a block diagram illustrating an example of a system for controlling a fuel-saving mode of a vehicle. While the accelerator is disengaged, the fuel-saving system 100 may select a fuel-saving mode based on anticipated braking requirements 115 and vehicle communication and telematics system 120. The vehicle communication and telematics system 120 may include an advanced driver-assistance system, a vehicle-to-everything communication, and a telematics system. The fuel-saving logic 110 may select the fuel-saving mode, including the engaged drivetrain coasting mode 150, the engine-idle coasting mode 160, or the engine-off coasting mode 170. The fuel-saving logic 110 selects the best fuel-saving mode based on the anticipated braking requirements 115 and the vehicle communication and telematics system 120.

The vehicle may switch between the fuel-saving modes to minimize fuel consumption and comply with safety requirements. The engaged drivetrain coasting mode 150 may include connecting the drivetrain to the engine and turning off the engine. The engaged drivetrain coasting mode 150 may comply with the highest safety requirements as this mode may be the most responsive to an unexpected event. The engine-idle coasting mode 160 may include disconnecting the drivetrain from the engine and maintaining the engine at idling speed. The engine-idle coasting mode 160 may conserve more fuel than the engaged drivetrain coasting mode 150 but comply with fewer safety requirements. The engine-off coasting mode 170 may include disconnecting the drivetrain from the engine and turning the engine off. The engine-off coasting mode may consume the least amount of fuel but comply with the fewest safety requirements.

Each fuel-saving mode is selected based on the anticipated braking requirements 115 and the vehicle communication and telematics system 120. Each fuel-saving mode may have a different potential for fuel saving while the accelerator is disengaged. The fuel-saving logic 110 may select the fuel-saving modes at various times during a vehicle trip. The fuel-saving logic 110 may frequently select one fuel-saving mode more than another based on a vehicle weight, a vehicle size, a vehicle model, and a vehicle age. Based on information from anticipated braking requirements 115 and vehicle communication and telematics system 120, the fuel-saving logic 110 may choose the best fuel saving strategy while ensuring vehicle driving safety. The fuel-saving logic 110 may select a fuel-saving mode based on whether a preceding vehicle is located within a predetermined distance to the vehicle and a nearby vehicle is located in an adjacent lane. The fuel-saving logic 110 may select a fuel-saving mode based on determining a moving distance of the vehicle without accelerator engagement. The moving distance of the vehicle without accelerator engagement may be calculated by the vehicle communication and telematics system 120. The moving distance of the vehicle without accelerator engagement may be based on an upcoming road condition detected by the vehicle communication and telematics system 120.

The anticipated braking requirements 115 may be the safety requirements to maintain safe driving conditions for the vehicle and a proximate vehicle. The anticipated braking requirements 115 may prevent a crash of the vehicle. The anticipated braking requirements 115 may prevent excessive speed of the vehicle. The anticipated braking requirements 115 may maximize the vehicle handling of the road. The anticipated braking requirements 115 may be a minimal level of safety requirements with which the vehicle must comply while towing a trailer. The anticipated braking requirements 115 may be based on a road condition. The anticipated braking requirement 115 may be the necessity to slow down for an obstacle in the road, such as standing water or an animal crossing. The anticipated braking requirements 115 may be based on a weather condition. The anticipated braking requirements 115 may be based on a proximate vehicle. The anticipated braking requirements 115 may be based on a road gradient profile satisfying a threshold. The road gradient profile may be measured using information gathered by the vehicle communication and telematics system 120.

The vehicle communication and telematics system 120 may collect road and surrounding traffic information. The vehicle communication and telematics system 120 may include an advanced driver-assistance system, a vehicle-to-everything communication, and a telematics system. The advanced driver-assistance system, the vehicle-to-everything communication, and the telematics system may collect the necessary information to choose a fuel-saving mode while maintaining safe driving conditions. The advanced driver-assistance system, the vehicle-to-everything communication, and the telematics system may collect the necessary information to provide information regarding whether a vehicle brake needs to be applied. The road condition may be detected by the advanced driver-assistance system, the vehicle-to-everything communication, and the telematics system.

The vehicle communication and telematics system 120 may collect proximate vehicle information. Proximate vehicle information may include the distance, speed, intentions, a profile, and the like of a nearby vehicle. In some embodiments, the anticipated braking requirement is based on a proximate vehicle detected by at least one of an advanced driver-assistance system, a vehicle-to-everything communication, and a telematics system. In some embodiments, the vehicle communication and telematics system 120 may collect surrounding traffic information to decide the best fuel-saving mode that minimizes the brake usage.

The vehicle communication and telematics system 120 may anticipate road conditions to reduce safety concerns. For example, the telematics system can provide information about the road ahead, such as a sharp curvature or a steep road gradient. The vehicle communication and telematics system 120 may anticipate reacceleration of the vehicle reacceleration to reduce or eliminate a delayed response. The vehicle communication and telematics system 120 may collect road condition information. Road condition information may include information regarding traffic signs, traffic lights, traffic signals, a construction zone, a change in the speed limit, an obstacle in the road, road network information, foreign objects on the road, a type of road, a road gradient, traffic information, a road curvature, a road profile, and the like. The vehicle communication and telematics system 120 may collect weather information.

The vehicle communication and telematics system 120 may collect information regarding a rolling velocity of the vehicle, a rolling distance of the vehicle, and rate of velocity change of the vehicle to choose between the fuel-saving modes. The fuel-saving logic 110 may determine that an anticipated braking requirement 115 exists based on the rolling velocity of the vehicle and the rate of velocity change of the vehicle. For example, the vehicle communication and telematics system 120 may choose the engaged drivetrain coasting mode 150 where the rate of velocity change is increasing to prevent the vehicle from traveling at an excessive speed. This strategy can minimize braking by using the resistance of the engine to slow the speed of the vehicle. In another example, the vehicle communication and telematics system 120 may choose engine-off coasting mode 170 or engine-idle coasting mode 160 when the rate of velocity change of the vehicle is decreasing.

The fuel-saving mode may change in real-time. For example, under downhill conditions, the fuel-saving mode may transition between the engaged drivetrain coasting mode 150, the engine-idle coasting mode 160, and the engine-off coasting mode 170 as the road gradient and anticipated braking requirements 115 change.

Figure 2:
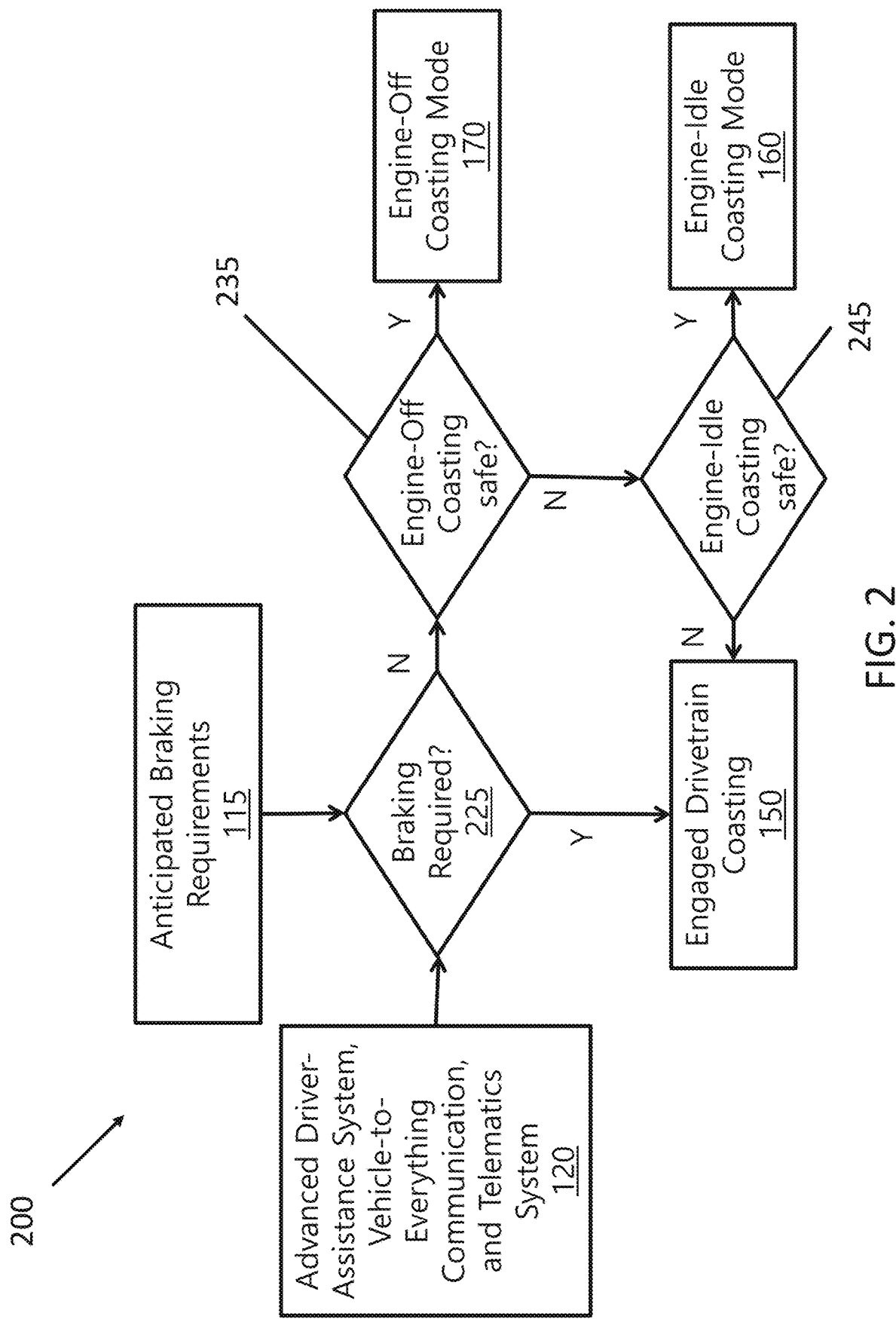
FIG. 2 depicts a flowchart illustrating an example of a process for selecting a fuel-saving mode of a vehicle.

FIG. 2 depicts a flowchart illustrating an example of a process for selecting a fuel-saving mode of a vehicle. The fuel-saving mode selection process 200 may select a fuel-saving mode based on anticipated braking requirements 115 and vehicle communication and telematics system 120. The vehicle communication and telematics system 120 may include an advanced driver-assistance system, a vehicle-to-everything communication, and a telematics system.

At 225, the information collected from vehicle communication and telematics system 120 and the anticipated braking requirements 115 is evaluated to determine whether braking is required. For example, braking may be required if a foreign object is detected on the roadway by the vehicle communication and telematics system 120 and the engaged drivetrain coasting mode 150 is selected. In another example, no braking is required where only a speed limit sign is detected by the vehicle communication and telematics system 120.

At 235, the information collected from vehicle communication and telematics system 120 and the anticipated braking requirements 115 is evaluated to determine whether engine-off coasting mode 170 is safe. For example, engine-off coasting mode 170 may be selected where the downhill road gradient is minimal and no preceding vehicles exist. In another example, engine-off coasting mode 170 may not be selected where a vehicle is following and the downhill road gradient is significant.

At 245, the information collected from the vehicle communication and telematics system 120 and the anticipated braking requirements 115 is evaluated to determine if engine-idle coasting mode 160 is safe. For example, engine-idle coasting mode 160 may be selected where the downhill road gradient is minimal, no vehicles are following, and the vehicle is approaching a stop sign. In another example, engine-idle coasting mode 160 may not be selected if a vehicle is following and the downhill road gradient is significant.

In some embodiments, a fuel-saving mode is selected based on an anticipated braking requirement in response to detecting the vehicle is non-stationary and the accelerator is disengaged. In some embodiments, a fuel-saving mode is selected based on an anticipated braking requirement in response to detecting a non-stationary vehicle with an engine and a drivetrain and the accelerator is disengaged. An instruction may be generated that corresponds to the selected fuel-saving mode. The instruction may be configured to control at least the engine and the drivetrain.

Engaged drivetrain coasting mode 150 may be selected when engine-idle coasting mode 160 and engine-off coasting mode 170 are both unsafe or when braking is needed. In some embodiments, engaged drivetrain coasting mode 150 is selected where extra braking might be needed by the vehicle. In some embodiments, safety criteria may be the deciding factor between selecting the engine-idle coasting mode 160 or the engine-off coasting mode 170. In some embodiments, whether braking is needed may be based on the vehicle communication and telematics system 120 information together and at least one of the rolling velocity of the vehicle, the rolling distance of the vehicle, and the rate of velocity change of the vehicle. Similar fuel-saving modes may be used for hybrid vehicles and electric vehicles for brake regeneration and the like.

Figure 3:
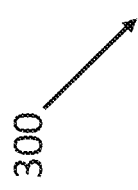
FIG. 3 depicts a table illustrating an example of comparisons between fuel-saving modes of a vehicle.

FIG. 3 depicts a table illustrating an example of comparisons between fuel-saving modes of a vehicle. The fuel-saving mode table 300 may include fuel-saving strategy modes that have different effects on the vehicle engine, the vehicle drivetrain, the vehicle distance traveled after disengaging the accelerator, the fuel consumption, and the safety.

The engaged drivetrain coasting mode 150 may include connecting the drivetrain to the engine and cutting fuel to the engine. In the engaged drivetrain coasting mode 150, the drivetrain may be connected to the engine. The least amount of fuel savings may be achieved during engaged drivetrain coasting mode 150 relative to the other fuel-saving modes. The least amount of rolling distance may be achieved during engaged drivetrain coasting mode 150 relative to the other fuel-saving modes. The engaged drivetrain coasting mode 150 may comply with the highest safety requirements as this mode may be the most responsive to an unexpected event. The engaged drivetrain coasting mode 150 may provide the vehicle with more safety relative to the other fuel-saving modes. The engaged drivetrain coasting mode 150 may include turning off the engine while the engine is connected to the drivetrain. The engaged drivetrain coasting mode may be selected in response to an operator enabling a brake of the non-stationary vehicle.

The engine-idle coasting mode 160 may include disconnecting the drivetrain from the engine and maintaining the engine at or above a minimum speed required to prevent stalling. In the engine-idle coasting mode 160, the transmission may be in neutral or the drivetrain may be disengaged from the engine. The engine-idle coasting mode 160 may include more fuel savings than engaged drivetrain coasting mode 150 but less fuel consumption than engine-off coasting mode 170. The engine-idle coasting mode 160 may include more rolling distance than engaged drivetrain coasting mode 150. The engine-idle coasting mode 160 may comply with fewer safety requirements than engaged drivetrain coasting mode 150 but more safety requirements than engine-off coasting mode 170.

Additionally, the engine-idle coasting mode 160 may conserve more fuel than the engaged drivetrain coasting mode 150 but comply with fewer safety requirements. The engine-idle coasting mode 160 may be less safe due to the transmission being in neutral and the engine idling. The engine-idle coasting mode 160 may be selected based on a traffic sign or a traffic signal requiring the non-stationary vehicle to reduce a speed thereof, the traffic sign and/or the traffic signal detected by the vehicle communication and telematics system 120. The engine-idle coasting mode 160 may be selected in response to determining that the anticipated braking requirement is unnecessary for a time interval calculated by the vehicle communication and telematics system 120.

The engine-off coasting mode 170 may include disconnecting the drivetrain from the engine and turning the engine off. In the engine-off coasting mode 170, the drivetrain may be in neutral or the transmission may be disengaged from the engine. The engine-off coasting mode 170 may include more fuel savings than engaged drivetrain coasting mode 150 and engine-idle coasting mode 160. The engine-off coasting mode 170 may include more rolling distance than engaged drivetrain coasting mode 150. The engine-off coasting mode 170 may comply with fewer safety requirements than engaged drivetrain coasting mode 150 and engine-idle coasting mode 160. The engine-off coasting mode 170 may consume the least amount of fuel but comply with the fewest safety requirements. The engine-off coasting mode 170 may be less safe due to the transmission being in neutral and the engine being turned off. The engine-off coasting mode 170 may be selected in response to determining that the anticipated braking requirement is unnecessary for a time interval calculated by the vehicle communication and telematics system 120. The engine-off coasting mode may be enabled in response to the vehicle communication and telematics system 120 determining that an upcoming road condition does not present a safety concern requiring braking.

Figure 4:
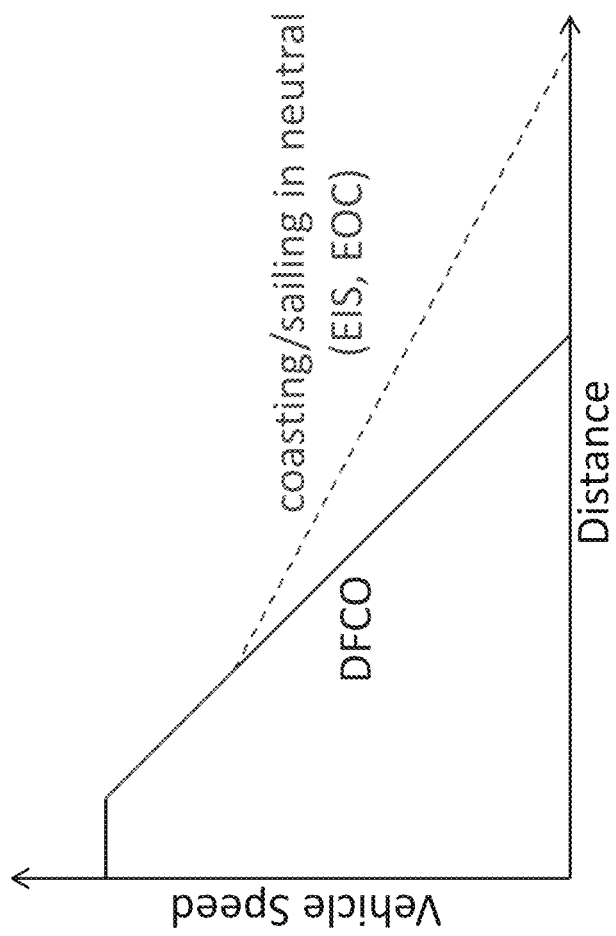
FIG. 4 depicts a diagram of an example in which a vehicle travels a shorter distance using an engaged drivetrain coasting mode in comparison to engine idle coasting mode and engine-off coasting mode.

FIG. 4 depicts a diagram of an example in which a vehicle travels a shorter distance using an engaged drivetrain coasting mode in comparison to engine idle coasting mode and engine-off coasting mode. Engine-idle coasting mode 160 and engine-off coasting mode 170 have longer coasting distances due to minimal driveline loss with transmission in neutral. Engaged drivetrain coasting mode 150 has a shorter coasting distance due to the driveline loss with the drivetrain connected to the engine.

FIG. 5A depicts a diagram of an example in which various fuel-saving modes are utilized based on a road gradient, the stop sign, and no proximate vehicle. While approaching a stop sign on a significant downhill gradient or a moderate downhill gradient, the engaged drivetrain coasting mode 150 may be selected to minimize the speed gain of the vehicle on the downhill gradient. While approaching the stop sign on a mild downhill gradient, the engine-idle coasting mode 160 may be selected to maintain the momentum of the vehicle to reach the stop sign. While approaching the stop sign on no downhill gradient, the engine-off coasting mode 170 may be selected to maintain the momentum of the vehicle to reach the stop sign. In some embodiments, the vehicle communication and telematics system 120 must be enabled when engine-off coasting mode 170 is selected to ensure safety.

FIG. 5B depicts a diagram of an example in which various fuel-saving modes are utilized based on a road gradient, the stop sign, and a proximate vehicle. While approaching a stop sign on a significant, moderate, or mild downhill gradient with a proximate vehicle, the engaged drivetrain coasting mode 150 may be selected to minimize the speed gain of the vehicle on the downhill gradient and to maximize the safety of the vehicle and the proximate vehicle. While approaching the stop sign on no downhill gradient with a proximate vehicle, the engine-idle coasting mode 160 may be selected to maintain the momentum of the vehicle to reach the stop sign and to ensure safety for the vehicle and the proximate vehicle.

FIG. 5C depicts a diagram of an example in which various fuel-saving modes are utilized based on a road gradient, a speed limit sign, and no proximate vehicle. While approaching the speed limit sign on a significant or moderate downhill gradient, the engaged drivetrain coasting mode 150 may be selected to minimize the speed gain of the vehicle on the downhill gradient. While approaching the speed limit sign on a mild downhill gradient, the engine-off coasting mode 170 may be selected for a time interval to maintain the speed posted on the speed limit sign. In some embodiments, the vehicle communication and telematics system 120 must be enabled when engine-off coasting mode 170 is selected to ensure safety. While approaching the speed limit sign on no downhill gradient with a proximate vehicle, none of the fuel-saving modes may be selected due to the need to maintain the speed posted on the speed limit sign.

FIG. 5D depicts a diagram of an example in which various fuel-saving modes are utilized based on a road gradient, a speed limit sign, and a proximate vehicle. While approaching the speed limit sign on a significant or moderate downhill gradient with a proximate vehicle, the engaged drivetrain coasting mode 150 may be selected to minimize the speed gain of the vehicle on the downhill gradient. While approaching the speed limit sign on a mild or no downhill gradient, none of the fuel-saving modes may be selected due to the need to maintain the speed posted on the speed limit sign.

Figure 6A:
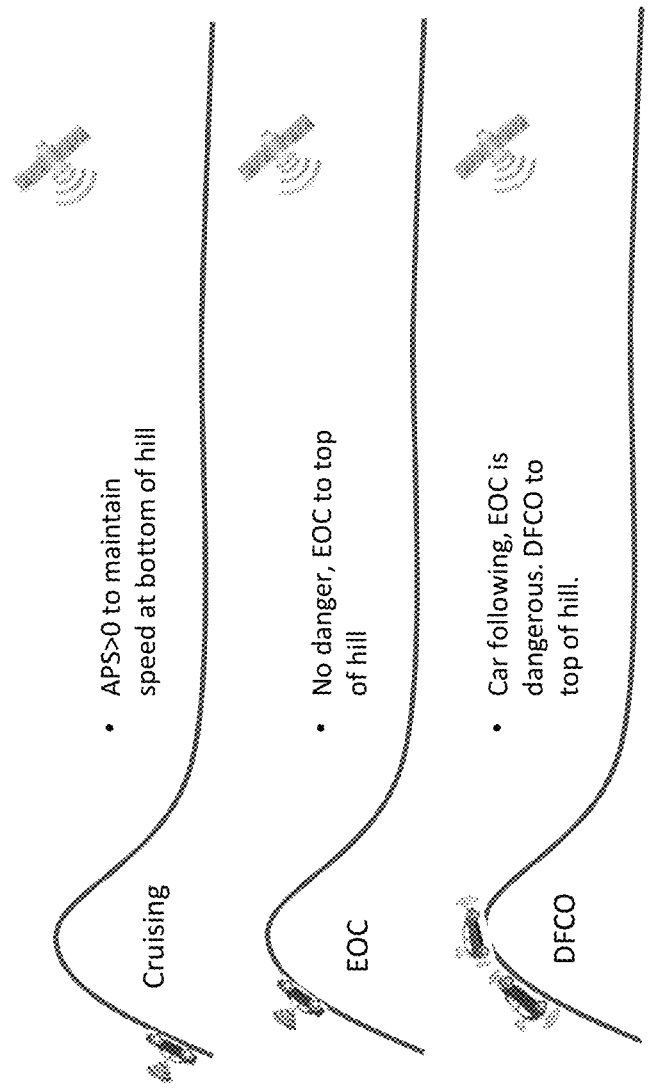
FIG. 6A depicts a diagram of an example in which various fuel-saving modes are utilized based on a hill, a telematics system, and the presence of a proximate vehicle.

FIG. 6A depicts a diagram of an example in which various fuel-saving modes are utilized based on a hill, a telematics system, and the presence of a proximate vehicle. While climbing a hill near the bottom without a proximate vehicle, the accelerator is applied and none of the fuel-saving modes may be selected due to the need to maintain speed to climb the hill. While climbing a hill near the top without a proximate vehicle, the engine-off coasting mode 170 may be selected based on the information from the vehicle communication and telematics system 120 and the ability to maintain speed through the crest of the hill. While climbing a hill near the top with a proximate vehicle, the engaged drivetrain coasting mode 150 may be selected to ensure the safety of the vehicle and the proximate vehicle.

Figure 6B:
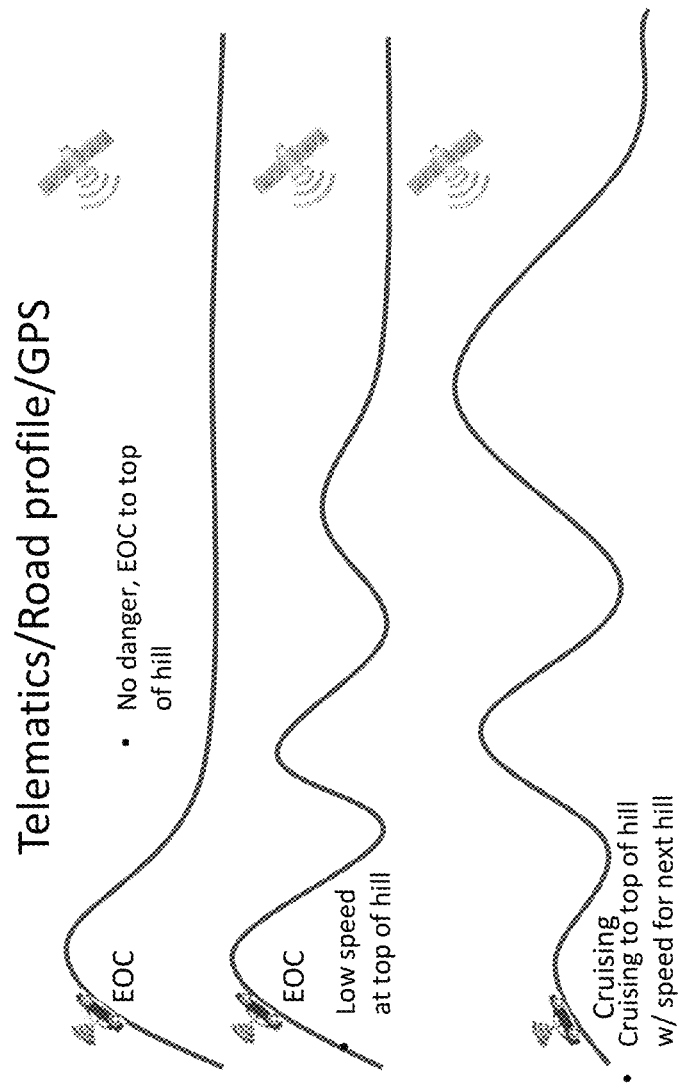
FIG. 6B depicts another diagram of an example in which various fuel-saving modes are utilized based on a hill, a telematics system, a road profile, and a GPS.

FIG. 6B depicts another diagram of an example in which various fuel-saving modes are utilized based on a hill, a telematics system, a road profile, and a GPS. While climbing a hill near the top, the engine-off coasting mode 170 may be selected based on the information from the vehicle communication and telematics system 120 and the ability to maintain speed through the crest of the hill. The vehicle communication and telematics system 120 may perceive no danger is ahead even though the road ahead cannot be viewed from the vehicle. In some embodiments, the vehicle communication and telematics system 120 must be enabled when engine-off coasting mode 170 is selected to ensure safety. While climbing a hill near the top, the accelerator may be applied and none of the fuel-saving modes may be selected due to the need to maintain the speed to climb the upcoming hills. The upcoming hills may be detected by the vehicle communication and telematics system 120.

In some embodiments, engaging the accelerator may be anticipated based on the information from the vehicle communication and telematics system 120. The engaged drivetrain coasting mode 150 may be selected when engaging the accelerator is anticipated to reduce or eliminate response delay. Engaging the accelerator may be anticipated based on the road ahead that requires the vehicle to climb a hill or to overtake a vehicle. The fuel-saving mode may be further based on an anticipated reengagement of the accelerator determined by the vehicle communication and telematics system 120.

Figure 7:
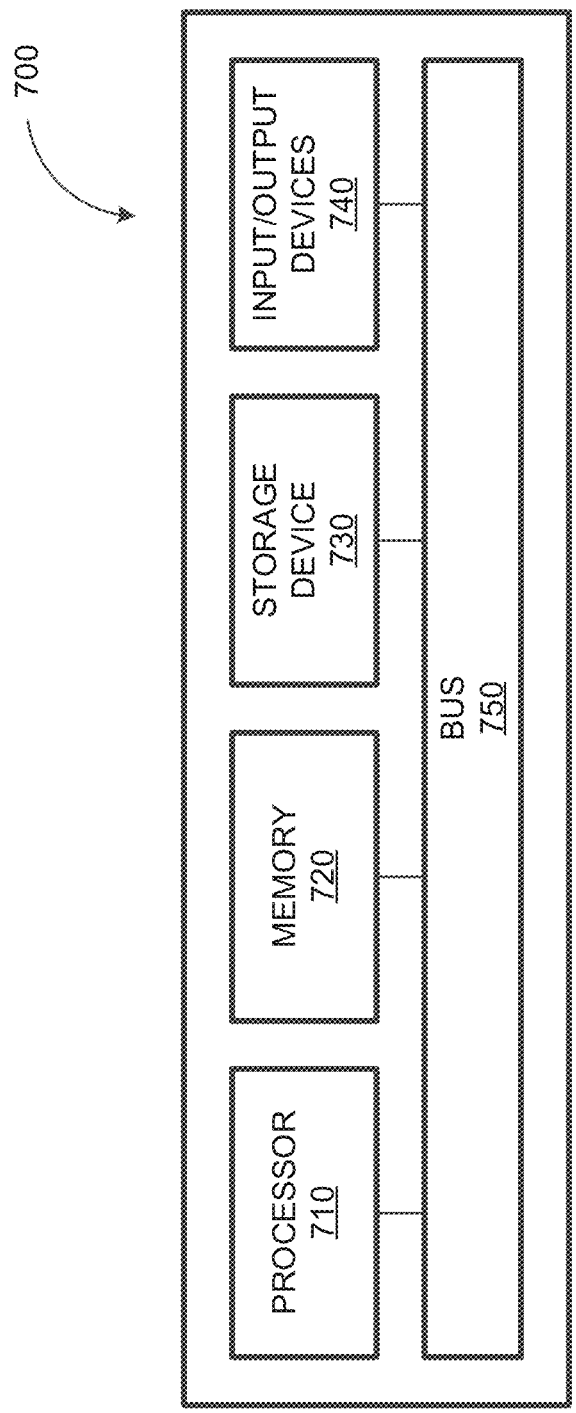
FIG. 7 depicts a block diagram illustrating a computing system 700 consistent with implementations of the current subject matter.

FIG. 7 depicts a block diagram illustrating a computing system 700 consistent with implementations of the current subject matter. Referring to FIGS. 1-7, the computing system 700 may be used for controlling the fuel-saving mode of a vehicle. For example, the computing system 700 may implement a user equipment, a personal computer, or a mobile device.

As shown in FIG. 7, the computing system 700 may include a processor 710, a memory 720, a storage device 730, and an input/output device 740. The processor 710, the memory 720, the storage device 730, and the input/output device 740 may be interconnected via a system bus 750. The processor 710 is capable of processing instructions for execution within the computing system 700. Such executed instructions may implement one or more components of, for example, cross-cloud code detection. In some example embodiments, the processor 710 may be a single-threaded processor. Alternately, the processor 710 may be a multi-threaded processor. The processor 710 is capable of processing instructions stored in the memory 720 and/or on the storage device 730 to display graphical information for a user interface provided via the input/output device 740.

The memory 720 is a computer-readable medium such as volatile or non-volatile that stores information within the computing system 700. The memory 720 may store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 740. The user interface can be generated and presented to a user by the computing system 700 (e.g., on a computer screen monitor, etc.).

The technical advantages presented herein may result in maximizing fuel savings, minimizing braking, and maintaining safe driving conditions during coasting. Engine off coasting may be utilized safely using the vehicle communication and telematics system 120, resulting in better fuel economy. In some cases, no additional hardware is necessary to carry out the technical embodiments described herein, resulting in fewer costs.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system comprising:
    a vehicle having an engine, a drivetrain, and an accelerator;
    a processor;
    a non-transitory computer-readable storage medium storing instructions that, when executed by the processor, cause the processor to perform operations comprising:
        selecting, in response to detecting the vehicle is non-stationary and the accelerator is disengaged, a fuel-saving mode based on an anticipated braking requirement; and
        generating an instruction corresponding the selected fuel-saving mode, wherein the instruction is configured to control at least the engine and the drivetrain.

2. The system of claim 1, wherein the fuel-saving mode is at least one of a engaged drivetrain coasting mode, an engine-idle coasting mode, and an engine-off coasting mode, and wherein the engaged drivetrain coasting mode includes connecting the drivetrain to the engine and turning off the engine, the engine-idle coasting mode includes disconnecting the drivetrain from the engine and maintaining the engine at or above a minimum speed required to prevent stalling, and the engine-off coasting mode includes disconnecting the drivetrain from the engine and turning the engine off.

3. The system of claim 1, wherein the anticipated braking requirement is based on a road condition and wherein the road condition is detected by at least one of an advanced driver-assistance system, a vehicle-to-everything communication, and a telematics system.

4. The system of claim 3, wherein the road condition includes at least one of a road gradient profile, a traffic sign, a traffic light, a construction zone, a change in a speed limit, an obstacle in a road, and a road curvature.

5. The system of claim 1, wherein the anticipated braking requirement is based on at least one of a weather condition and a proximate vehicle.

6. The system of claim 1, wherein the fuel-saving mode is further based on whether a preceding vehicle is located within a predetermined distance to the vehicle and a nearby vehicle is located in an adjacent lane.

7. The system of claim 1, wherein the fuel-saving mode is further based on determining a moving distance of the vehicle without accelerator engagement.

8. The system of claim 7, wherein the moving distance of the vehicle without accelerator engagement is calculated by at least one of an advanced driver-assistance system, a vehicle-to-everything communication, and a telematics system.

9. The system of claim 7, wherein the moving distance of the vehicle without accelerator engagement is further based on an upcoming road condition detected by at least one of an advanced driver-assistance system, a vehicle-to-everything communication, and a telematics system.

10. The system of claim 1, wherein the fuel-saving mode is further based on an anticipated reengagement of the accelerator determined by at least one of advanced driver-assistance system, a vehicle-to-everything communication, and a telematics system.

11. A non-transitory computer-readable medium comprising instructions which, when executed by at least one processor, cause operations comprising:
   selecting, in response to detecting a non-stationary vehicle with an engine and a drivetrain and an accelerator is disengaged, a fuel-saving mode based on an anticipated braking requirement; and
   generating an instruction corresponding the selected fuel-saving mode, wherein the instruction is configured to control at least the engine and the drivetrain.

12. The non-transitory computer-readable medium of claim 11, wherein the fuel-saving mode is one of an engaged drivetrain coasting mode, an engine-idle coasting mode, and an engine-off coasting mode, and wherein the engaged drivetrain coasting mode includes connecting the drivetrain to the engine and turning off the engine, the engine-idle coasting mode includes disconnecting the drivetrain from the engine and maintaining the engine at or above a minimum speed required to prevent stalling, and the engine-off coasting mode includes disconnecting the drivetrain from the engine and turning the engine off.

13. The non-transitory computer-readable medium of claim 12, wherein the engaged drivetrain coasting mode is selected in response to an operator enabling a brake of the non-stationary vehicle.

14. The non-transitory computer-readable medium of claim 12, wherein the anticipated braking requirement is based on a proximate vehicle detected by at least one of an advanced driver-assistance system, a vehicle-to-everything communication, and a telematics system.

15. The non-transitory computer-readable medium of claim 12, wherein the anticipated braking requirement is based on at least one of a road condition and detection of a proximate vehicle, and wherein the anticipated braking requirement is based on a road gradient profile satisfying a threshold using information gathered by at least one of an advanced driver-assistance system, a vehicle-to-everything communication, and a telematics system.

16. The non-transitory computer-readable medium of claim 12, wherein the engine-idle coasting mode is selected based on at least one of traffic sign and a traffic signal requiring the non-stationary vehicle to reduce a speed thereof, the at least one of the traffic sign and the traffic signal detected by at least one of an advanced driver-assistance system, a vehicle-to-everything communication, and a telematics system.

17. The non-transitory computer-readable medium of claim 12, wherein the engine-idle coasting mode or the engine off coasting mode is selected in response to determining that the anticipated braking requirement is unnecessary for a time interval calculated by at least one of an advanced driver-assistance system, a vehicle-to-everything communication, and a telematics system.

18. The non-transitory computer-readable medium of claim 12, wherein the engine-off coasting mode is enabled in response to an advanced driver-assistance system, a vehicle-to-everything communication, and a telematics system determining that an upcoming road condition does not present a safety concern requiring braking.

19. A method comprising:
   selecting, in response to detecting a non-stationary vehicle with an engine and a drivetrain and an accelerator is disengaged, a fuel-saving mode based on an anticipated braking requirement; and
   generating an instruction corresponding the selected fuel-saving mode, wherein the instruction is configured to control at least the engine and the drivetrain.

20. The method of claim 19, wherein the fuel-saving mode is one of an engaged drivetrain coasting mode, an engine-idle coasting mode, and an engine-off coasting mode, and wherein the engaged drivetrain coasting mode includes connecting the drivetrain to the engine and turning off the engine, the engine-idle coasting mode includes disconnecting the drivetrain from the engine and maintaining the engine at or above a minimum speed required to prevent stalling, and the engine-off coasting mode includes disconnecting the drivetrain from the engine and turning the engine off.

* * * * *